(12) United States Patent
Lee et al.

(10) Patent No.: US 12,554,975 B2
(45) Date of Patent: Feb. 17, 2026

(54) NEURAL NETWORK COMPUTING DEVICE INCLUDING ON-DEVICE QUANTIZER, OPERATING METHOD OF NEURAL NETWORK COMPUTING DEVICE, AND COMPUTING DEVICE INCLUDING NEURAL NETWORK COMPUTING DEVICE

(71) Applicant: Electronics and Telecommunications Research Institute, Daejeon (KR)

(72) Inventors: Mi Young Lee, Daejeon (KR); Young-deuk Jeon, Sejong-si (KR); Byung Jo Kim, Sejong-si (KR); Ju-Yeob Kim, Daejeon (KR); Jin Kyu Kim, Sejong-si (KR); Ki Hyuk Park, Daejeon (KR); Joo Hyun Lee, Daejeon (KR); Min-Hyung Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1372 days.

(21) Appl. No.: 17/205,433

(22) Filed: Mar. 18, 2021

(65) Prior Publication Data
US 2021/0303982 A1    Sep. 30, 2021

(30) Foreign Application Priority Data
Mar. 30, 2020   (KR) .................. 10-2020-0038416

(51) Int. Cl.
*G06N 3/065* (2023.01)
*G06F 7/544* (2006.01)
*G06N 3/08* (2023.01)

(52) U.S. Cl.
CPC ........... *G06N 3/065* (2023.01); *G06F 7/5443* (2013.01); *G06N 3/08* (2013.01)

(58) Field of Classification Search
CPC ......... G06F 7/5443; G06N 3/065; G06N 3/08
See application file for complete search history.

(56) References Cited

U.S. PATENT DOCUMENTS 9,224,089 B2   12/2015 Majumdar et al.
10,452,979 B2  10/2019 Park
(Continued)

FOREIGN PATENT DOCUMENTS

JP       4340939      10/2009
KR    10-2016-0069834   6/2016
(Continued)

OTHER PUBLICATIONS

Markus Nagel et al., "Data-Free Quantization Through Weight Equalization and Bias Correction", Qualcomm AI Research, arXiv:1906.04721v3 [cs.LG] Nov. 25, 2019.
(Continued)

*Primary Examiner* — Michael D. Yaary
(74) *Attorney, Agent, or Firm* — KILE PARK REED & HOUTTEMAN PLLC

(57) ABSTRACT

Disclosed is a neural network computing device. The neural network computing device includes a neural network accelerator including an analog MAC, a controller controlling the neural network accelerator in one of a first mode and a second mode, and a calibrator that calibrating a gain and a DC offset of the analog MAC. The calibrator includes a memory storing weight data, calibration weight data, and calibration input data, a gain and offset calculator reading the calibration weight data and the calibration input data from the memory, inputting the calibration weight data and the calibration input data to the analog MAC, receiving calibration output data from the analog MAC, and calculating the gain and the DC offset of the analog MAC, and an on-device quantizer reading the weight data, receiving the
(Continued)

gain and the DC offset, generating quantized weight data, based on the gain and the DC offset.

20 Claims, 7 Drawing Sheets

(56) References Cited

U.S. PATENT DOCUMENTS

| | | | |
|---|---|---|---|
| 11,593,573 B2* | 2/2023 | Kraemer | G06N 3/063 |
| 2016/0086078 A1 | 3/2016 | Ji et al. | |
| 2018/0253643 A1 | 9/2018 | Buchanan et al. | |
| 2019/0164037 A1 | 5/2019 | Kim et al. | |
| 2019/0213471 A1 | 7/2019 | Jeon et al. | |
| 2019/0213472 A1 | 7/2019 | Park et al. | |
| 2022/0393913 A1* | 12/2022 | Orhan | H04L 27/2675 |

FOREIGN PATENT DOCUMENTS

| | | |
|---|---|---|
| KR | 10-2018-0101276 | 9/2018 |
| KR | 10-2019-0085781 | 7/2019 |
| KR | 10-2019-0085785 | 7/2019 |

OTHER PUBLICATIONS

Benoit Jacob et al., "Quantization and Training of Neural Networks for Efficient Integer-Arithmetic-Only Inference", IEEE/CVF Conference on Computer Vision and Pattern Recognition, Dec. 17, 2018, pp. 2704-2713.

Philipp Gysel et al. "Hardware-Oriented Approximation of Convolutional Neural Networks", Accepted as a workshop contribution at ICLR 2016, arXiv:1604.03168v3 [cs.CV] Oct. 20, 2016, pp. 1-8.

* cited by examiner

NEURAL NETWORK COMPUTING DEVICE INCLUDING ON-DEVICE QUANTIZER, OPERATING METHOD OF NEURAL NETWORK COMPUTING DEVICE, AND COMPUTING DEVICE INCLUDING NEURAL NETWORK COMPUTING DEVICE

CROSS-REFERENCE TO RELATED APPLICATIONS

This application claims priority under 35 U.S.C. § 119 to Korean Patent Application No. 10-2020-0038416 filed on Mar. 30, 2020, in the Korean Intellectual Property Office, the disclosures of which are incorporated by reference herein in their entireties.

BACKGROUND

Embodiments of the present disclosure described herein relate to an electronic device, and more particularly, relate to a neural network computing device including an on-device quantizer that quantizes weight data, an operating method of the neural network computing device, and a computing device including the neural network computing device.

A machine learning of neural networks aims to generate weight data that may perform inference. Typically, the weight data are implemented as very long floating point data. To reduce resources required for inference and to increase a speed of inference, a method of quantizing the weight data has been studied.

A quantization of the weight data may lower an accuracy of inference. To prevent a decrease in inference accuracy, additional learning may be performed to compensate for errors in a quantization process. However, as technologies related to machine learning develop, a way to maintain or increase the reliability of inference without performing learning to compensate for errors in the quantization process has been proposed.

SUMMARY

Embodiments of the present disclosure provide a neural network computing device including an on-device quantizer that does not perform learning to compensate for errors in a quantization process, an operating method of the neural network computing device, and a computing device including the neural network computing device.

According to an embodiment of the present disclosure, a neural network computing device includes a neural network accelerator including an analog MAC, a controller that controls the neural network accelerator in one of a first mode and a second mode, and a calibrator that calibrates a gain and a DC offset of the analog MAC, when the analog MAC is in the first mode. The calibrator includes a memory that stores weight data that are learned based on a machine learning, calibration weight data, and calibration input data, a gain and offset calculator that reads the calibration weight data and the calibration input data from the memory, inputs the calibration weight data to the analog MAC, inputs the calibration input data to the analog MAC, receives calibration output data from the analog MAC, and calculates the gain and the DC offset of the analog MAC from the calibration output data, and an on-device quantizer that reads the weight data from the memory, receives the gain and the DC offset from the gain and offset calculator, generates quantized weight data by quantizing the weight data, based on the gain and the DC offset, and stores the quantized weight data in the memory.

According to an embodiment, the quantized weight data stored in the memory may be input to the analog MAC.

According to an embodiment, the analog MAC may include variable resistance synaptic elements. The analog MAC may be composed to adjust resistance values of the variable resistance synaptic elements, based on the quantized weight data.

According to an embodiment, after the resistance values of the variable resistance synaptic elements are adjusted based on the quantized weight data, the controller may control the neural network accelerator in the second mode.

According to an embodiment, in the second mode, in response to a request of an external device, the controller may be further composed to adjust the number of bits of the quantized weight data, and to control the neural network accelerator in the first mode.

According to an embodiment, in the second mode, the analog MAC may generate output data by performing an inference on input data received from an external device.

According to an embodiment, the neural network accelerator may further include a classifier configured to classify a type of the input data, based on the output data, and to output the classified result to the external device.

According to an embodiment, the analog MAC, the calibrator, and the controller may be integrated into one integrated circuit.

According to an embodiment, the calibration input data may include different values belonging to a range of values of input data of the analog MAC.

According to an embodiment, the calibration weight data may include different values belonging to a range of values of the weight data of the analog MAC.

According to an embodiment, the analog MAC may include synaptic elements arranged in rows and columns, a word line bias block connected to rows of the synaptic elements through word lines, and that inputs the calibration input data or input data to the word lines, and a bit line bias and detection block connected to the columns of the synaptic elements through bit lines, and that generates the calibration output data or output data by summing currents received through at least one selected bit line among the bit lines.

According to an embodiment, the word line bias block may be further composed to input the calibration weight data to the word lines. The bit line bias and detection block may be further composed to adjust voltages of the bit lines such that the calibration weight data are written to selected synaptic elements among the synaptic elements.

According to an embodiment of the present disclosure, a method of operating a neural network computing device including an analog multiplier and accumulator (MAC) and an on-device quantizer includes obtaining a gain and a DC offset of the analog MAC, quantizing weight data using the gain and the DC offset, and writing the quantized weight data in the analog MAC.

According to an embodiment, the obtaining of the gain and the DC offset may include writing calibration weight data in the analog MAC, inputting calibration input data to the analog MAC, obtaining calibration output data corresponding to the calibration weight data and the calibration input data from the analog MAC, and calculating the gain and the DC offset of the analog MAC from the calibration output data.

According to an embodiment, the method of operating the neural network computing device may further include inputting input data to the analog MAC, obtaining output data corresponding to the input data and the quantized weight data from the analog MAC, and classifying a type of the input data, based on the output data.

According to an embodiment, the method of operating the neural network computing device may further include, in response to a request from an external device, again performing the obtaining of the gain and the DC offset, the quantizing of the weight data, and the writing of the quantized weight data.

According to an embodiment, the again performing of the obtaining, the quantizing, and the writing may include adjusting the number of bits of the quantized weight data.

According to an embodiment of the present disclosure, a computing device includes a main memory, a processor that executes commands and processes data, using the main memory, and a neuromorphic processor that performs a calibration in a first mode in response to a request of the processor and performs an inference on image data in a second mode. The neuromorphic processor includes a neural network accelerator including an analog multiplier and accumulator (MAC), a controller that controls the neural network accelerator in one of the first mode and the second mode, and a calibrator that calibrates a gain and a DC offset of the analog MAC, when the analog MAC is in the first mode. The neuromorphic processor quantizes weight data, based on the gain and the DC offset of the analog MAC, writes the quantized weight data in the analog MAC, enters the second mode, and notifies the processor of entering the second mode.

According to an embodiment, the calibrator may include a memory that stores the weight data that are learned based on a machine learning, calibration weight data, and calibration input data, a gain and offset calculator that reads the calibration weight data and the calibration input data from the memory, inputs the calibration weight data to the analog MAC, inputs the calibration input data to the analog MAC, receives calibration output data from the analog MAC, and calculates the gain and the DC offset of the analog MAC from the calibration output data, and an on-device quantizer that reads the weight data from the memory, receives the gain and the DC offset from the gain and offset calculator, generates quantized weight data by quantizing the weight data, based on the gain and the DC offset, and stores the quantized weight data in the memory.

According to an embodiment, the computing device may further include storage that stores data nonvolatilely, a modem that communicates with an external device, and a user interface that exchanges information with a user, and includes a camera. The image data may be received from at least one of the main memory, the storage, the modem, and the camera.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, embodiments of the present disclosure will be described clearly and in detail such that those skilled in the art may easily carry out the present disclosure.

Figure 1:
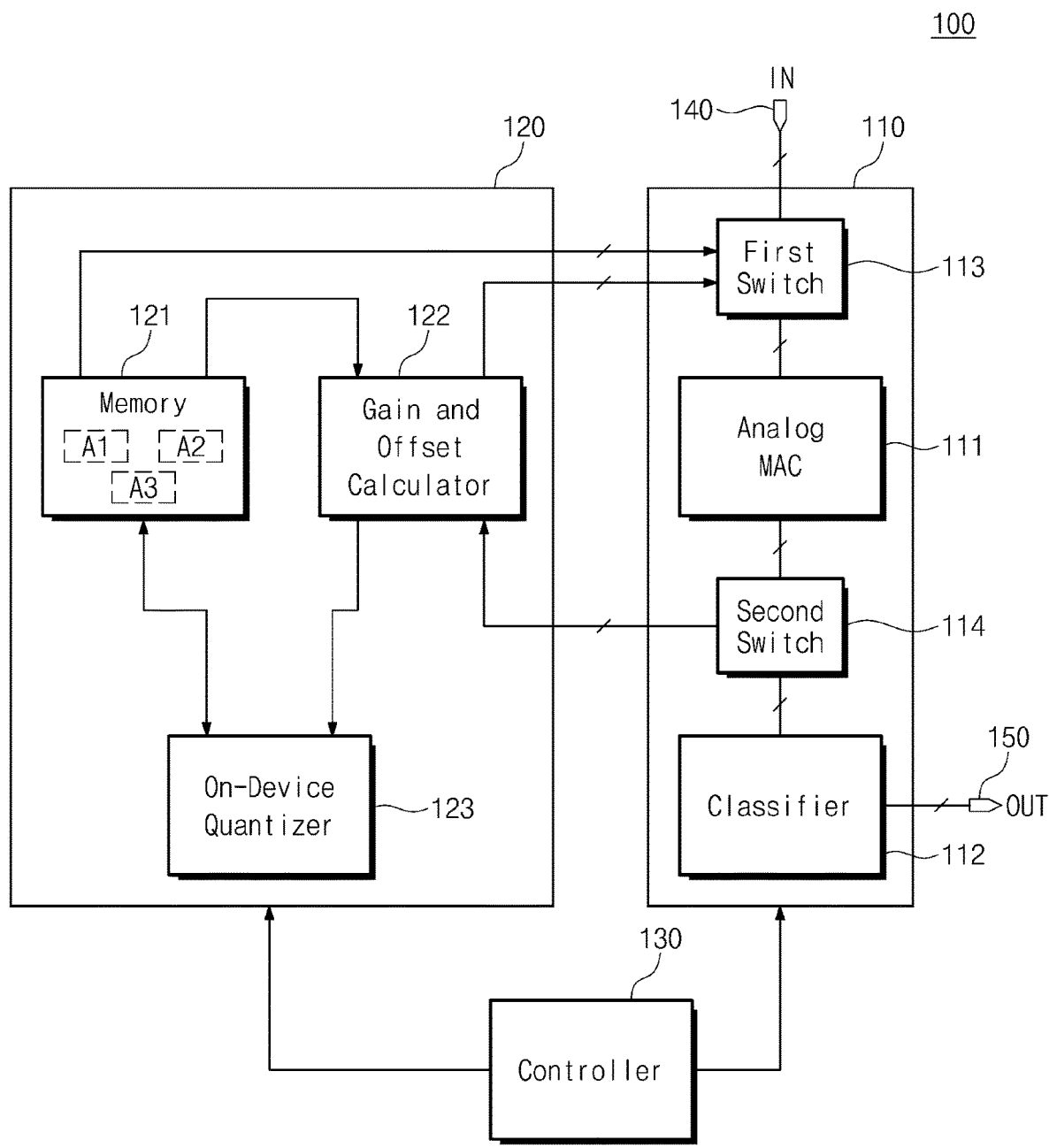
FIG. 1 is a diagram illustrating an example of a neural network computing device according to an embodiment of the present disclosure.

FIG. 1 illustrates an example of a neural network computing device 100 according to an embodiment of the present disclosure. Referring to FIG. 1, the neural network computing device 100 may include a neural network accelerator 110, a calibrator 120, and a controller 130.

The neural network accelerator 110 may perform neural network computations. For example, the neural network accelerator 110 may be configured to accelerate the neural network computations by being implemented in hardware. The neural network accelerator 110 may operate in a first mode (e.g., a calibration mode) and a second mode (e.g., an inference mode).

In the first mode, the neural network accelerator 110 may perform a calibration together with the calibrator 120. In the second mode, the neural network accelerator 110 may operate independently of the calibrator 120.

The neural network accelerator 110 may include an analog multiplier and accumulator (MAC) 111, a classifier 112, a first switch 113, and a second switch 114.

The analog MAC 111 may process data received through the first switch 113. In each of the first mode and the second mode, the analog MAC 111 may operate in a weight writing mode and a neural network computation mode.

In the weight writing mode, the analog MAC 111 may write the data received through the first switch 113 as weights. For example, the analog MAC 111 may be implemented to store each of the weights with a determined number of bits. The number of bits may be determined, for example, by a parameter called a hyper bit.

In the neural network computation mode, the analog MAC 111 may calculate (i.e., multiply and accumulate) the data received through the first switch 113 with a weight, and may output a result. For example, the analog MAC 111 may be implemented to store each of the weights with the determined number of bits. The number of bits may be determined, for example, by the parameter called the hyper bit. The analog MAC 111 may output the result of the neural network computation to the second switch 114.

The classifier 112 may generate output data OUT, based on data received from the second switch 114 in the neural network computation mode. The output data OUT may include a result of classification of input data IN. For example, when the input data IN are image data, and the neural network accelerator 110 is configured to classify a type of the image data, the output data OUT may indicate the type of an object included in the image of the input data IN. The output data OUT may be output to an external device through output nodes 150.

For example, the classifier 112 may store mapping information of the output data OUT depending on a value of data received from the second switch 114. The classifier 112 may generate the output data OUT from the data received from the second switch 114, based on the mapping information.

The first switch 113 may connect inputs of the analog MAC 111 to the calibrator 120 in the first mode. The first switch 113 may connect input nodes 140 to the inputs of the analog MAC 111 in the second mode. The first switch 113 may transfer the input data IN received through the input nodes 140 to the analog MAC 111.

The second switch 114 may connect outputs of the analog MAC 111 to the calibrator 120 in the first mode. The second switch 114 may connect the outputs of the analog MAC 111 to the classifier 112 in the second mode.

The calibrator 120 may calibrate a gain and a direct current (DC) offset of the analog MAC 111 of the neural network accelerator 110 in the first mode. The calibrator 120 may be deactivated in the second mode. For example, the calibrator 120 may enter a power saving mode and may consume less power than power consumed in the first mode.

The calibrator 120 may include a memory 121, a gain and offset calculator 122, and an on-device quantizer 123. The memory 121 may be various volatile or nonvolatile memories (e.g., a random access memory) such as a dynamic RAM, a static RAM, a PRAM, an MRAM, an FRAM, an RRAM, a flash memory, etc.

The memory 121 may include a first area A1, a second area A2, and a third area A3. Raw data of weight data may be stored in the first area A1 of the memory 121. Each value of the raw data may be represented by, for example, 32-bit floating point.

The raw data may be written in the first area A1 of the memory 121 when the neural network computing device 100 is manufactured. Alternatively, after the neural network computing device 100 is mounted in a computing system, the raw data may be received from the external device and may be stored in the first area A1 of the memory 121.

Calibration data for calibration of the analog MAC 111 of the neural network accelerator 110 may be stored in the second area A2 of the memory 121. The analog MAC 111 may have the gain and the DC offset depending on a manufacturing process and depending on a ratio of materials used in the manufacture of the analog MAC 111 and environment in the manufacture of the analog MAC 111.

The calibration data may be used to calibrate the gain and the DC offset of the analog MAC 111. The calibration data may include calibration weight data and calibration input data. The calibration weight data may be written in the analog MAC 111 as the weight data in the first mode. The calibration weight data may include at least one of each of values that the weight data of the analog MAC 111 may have. Accordingly, in the first mode, calibration of the gain and the DC offset associated with all values of the weight data of the analog MAC 111 may be performed.

The calibration input data may be written in the analog MAC 111 as the input data in the first mode. The calibration input data may include at least one of each of values that the input data of the analog MAC 111 may have. Accordingly, in the first mode, calibration of the gain and the DC offset associated with all values of the input data of the analog MAC 111 may be performed.

The third area A3 of the memory 121 may be composed to store the weight data quantized by the on-device quantizer 123. For example, each value of the quantized weight data may be represented by a determined number of bits by the hyper parameter. For example, each value of the quantized weight data may be an 8-bit integer.

The gain and offset calculator 122 may monitor the output data depending on the calibration data of the analog MAC 111 in the first mode. The gain and offset calculator 122 may calculate bias information of the gain and the DC offset, based on the monitored result.

The on-device quantizer 123 may perform quantization on the raw data of the first area A1 of the memory 121, based on the bias information calculated by the gain and offset calculator 122. The weight data quantized by the on-device quantizer 123 may be calculated to compensate for the bias information of the gain and the DC offset. The on-device quantizer 123 may store the quantized weight data in the third area A3 of the memory 121.

Figure 2:
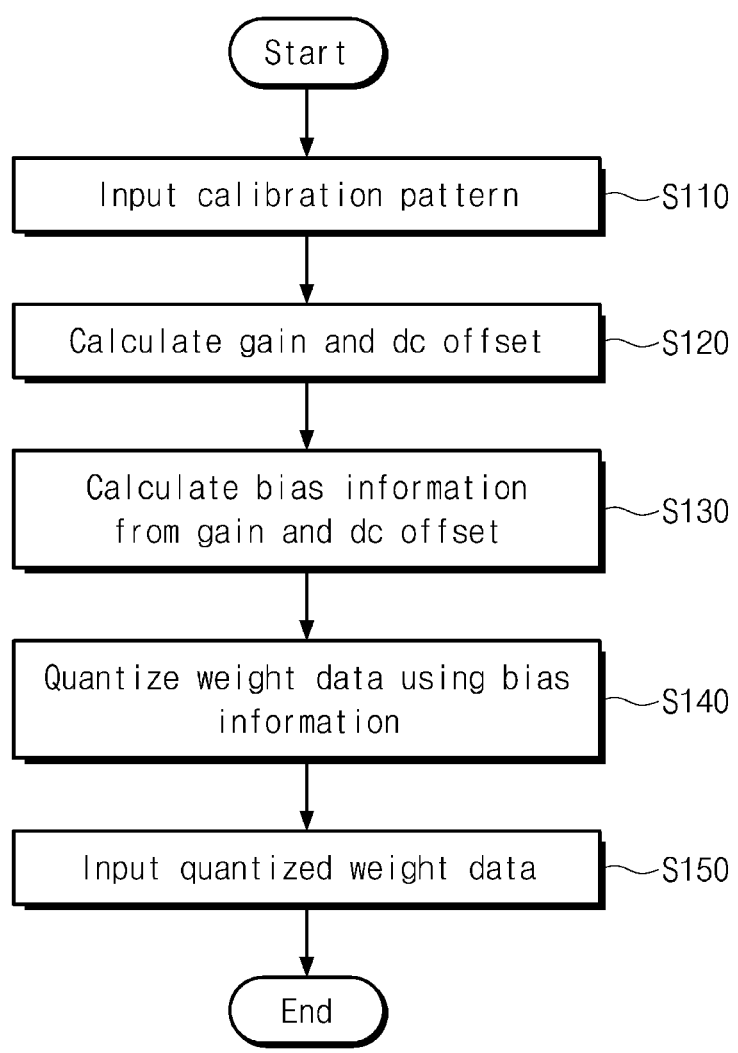
FIG. 2 illustrates an example of an operating method of a neural network computing device of FIG. 1.

The controller 130 may control the neural network accelerator 110 and the calibrator 120. The controller 130 may control the neural network accelerator 110 and the calibrator 120 in the first mode and the second mode. The controller 130 may control the analog MAC 111 in the weight writing mode and the neural network computation mode FIG. 2 describes an example of an operating method of the neural network computing device 100 of FIG. 1. Referring to FIGS. 1 and 2, in operation S110, the neural network computing device 100 may input a calibration pattern. For example, the controller 130 may control the neural network accelerator 110 and the calibrator 120 in the first mode.

The controller 130 may control the analog MAC 111 in the weight writing mode. Under a control of the controller 130, the gain and offset calculator 122 may read the calibration data from the second area A2 of the memory 121. The controller 130 may control the first switch 113 to connect the outputs of the gain and offset calculator 122 to the inputs of the analog MAC 111.

Under the control of the controller 130, the gain and offset calculator 122 may output the calibration weight data to the first switch 113. The first switch 113 may transfer the calibration weight data to the analog MAC 111. The analog MAC 111 may write the calibration weight data. Thereafter, the controller 130 may control the analog MAC 111 in the neural network computation mode.

Under the control of the controller 130, the gain and offset calculator 122 may output the calibration input data to the first switch 113. The first switch 113 may transfer the calibration input data to the analog MAC 111. The analog MAC 111 may multiply the calibration weight data with the calibration input data and may accumulate the multiplication result.

The controller 130 may control the second switch 114 to connect the outputs of the analog MAC 111 to the gain and offset calculator 122. The analog MAC 111 may output the results of the computation to the second switch 114. The second switch 114 may transfer the outputs of the analog MAC 111 to the gain and offset calculator 122.

In operation S120, the gain and offset calculator 122 may monitor the outputs of the analog MAC 111. The gain and offset calculator 122 may calculate (or detect) the gain and the DC offset of the analog MAC 111, based on the monitored result. For example, the gain and offset calculator 122 may calculate the gain and the DC offset by entering two or more calibration input data, or by entering the calibration input data more than twice.

In operation S130, the gain and offset calculator 122 may calculate the bias information from the gain and the DC offset. For example, the bias information may be calculated by dividing an initial bias by a gain error, and subtracting the DC offset from the result of the division.

In operation S140, the on-device quantizer 123 may receive the bias information from the gain and offset calculator 122. The on-device quantizer 123 may read the raw data of the weight data from the first area A1 of the memory 121. The on-device quantizer 123 may quantize the raw data, based on the bias information. For example, the on-device quantizer 123 may perform a dynamic range quantization. The on-device quantizer 123 may store the quantized weight data in the third area A3 of the memory 121.

In operation S150, the controller 130 may control the analog MAC 111 in the weight writing mode. Under the control of the controller 130, the quantized weight data of the third area A3 of the memory 121 may be transferred to the analog MAC 111 through the first switch 113. The analog MAC 111 may write quantized weight data.

When writing of the quantized weight data is completed, the controller 130 may control the analog MAC 111 in the neural network computation mode, and control the neural network accelerator 110 and the calibrator 120 in the second mode. For example, the controller 130 may control the first switch 113 to connect the input nodes 140 to the input nodes of the analog MAC 111, and may control the second switch 114 to connect the output nodes of the analog MAC 111 to the classifier 112.

Thereafter, the neural network computing device 100 may be used to output the output data OUT by performing the neural network computation on the input data IN. As an example, when performance (e.g., speed, accuracy, reliability, etc.) of the neural network computation of the neural network computing device 100 does not satisfy a request, the calibration may be performed again.

For example, the controller 130 may increase (or decrease) the hyper parameter, and may again perform the method described with reference to FIG. 2.

Figure 3:
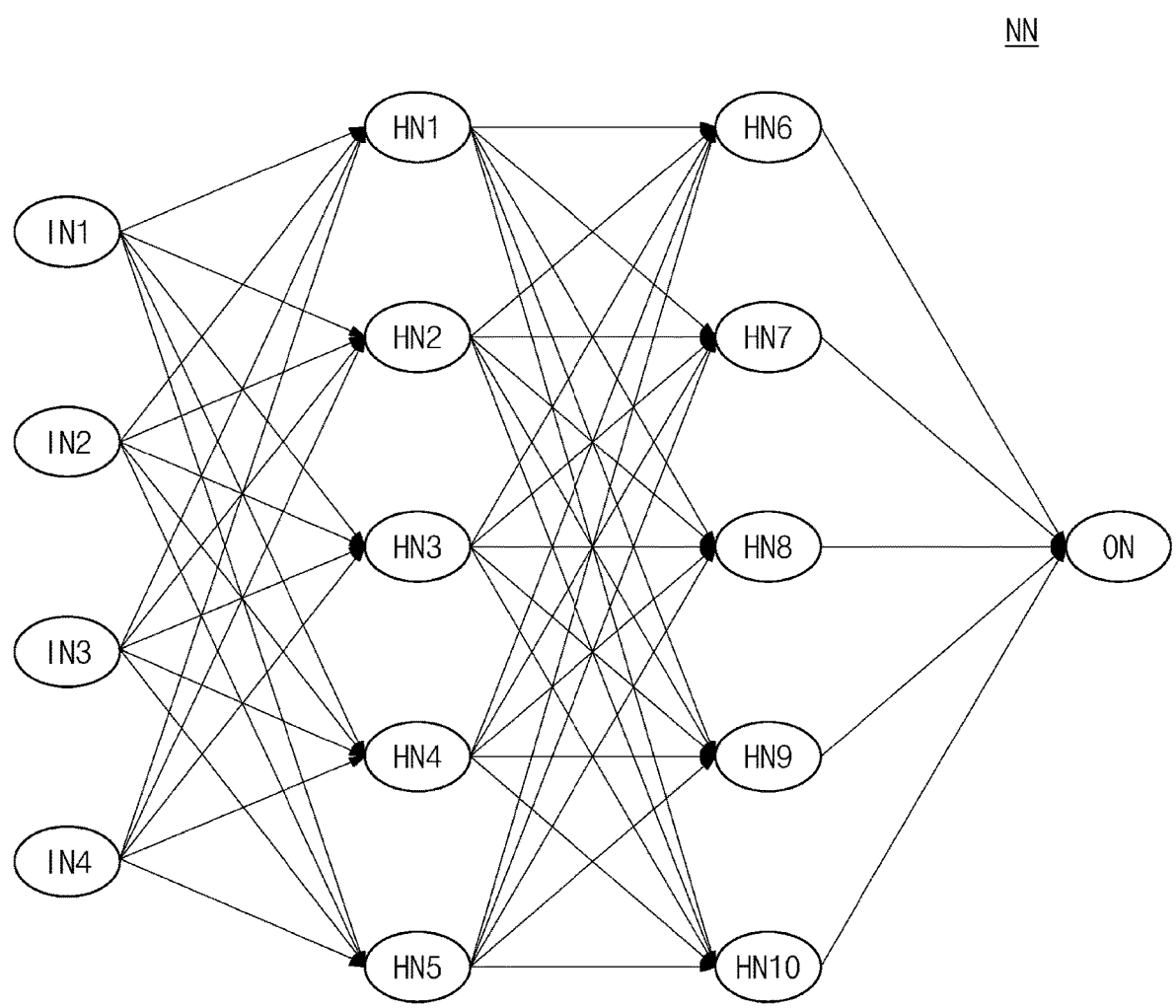
FIG. 3 is a diagram illustrating an example of a neural network implemented based on a machine learning in an analog MAC.

FIG. 3 illustrates an example of a neural network NN implemented based on a machine learning in the analog MAC 111. For example, the neural network NN includes various derivative implementations such as an artificial neural network (ANN), a convolution neural network (CNN), a recursive neural network (RNN), etc.

Referring to FIG. 3, the neural network NN includes first to fourth input nodes IN1 to IN4, first to tenth hidden nodes HN1 to HN10, and an output node ON. The number of the input nodes, the number of the hidden nodes, and the number of the output nodes may be determined in advance when the neural network NN is configured.

The first to fourth input nodes IN1 to IN4 form an input layer. The first to fifth hidden nodes HN1 to HN5 form a first hidden layer. The sixth to tenth hidden nodes HN6 to HN10 form a second hidden layer. The output node ON forms an output layer. The number of the hidden layers may be determined in advance when the neural network NN is configured.

Data for learning or inference may be input to the first to fourth input nodes IN1 to IN4. The value of each input node is transferred to the first to fifth hidden nodes HN1 to HN5 of the first hidden layer through illustrated branches (or synapses). Each of the branches (or synapses) may be designated to have a corresponding synaptic value or a weight. The value of each input node may be calculated (e.g., multiplied) with the synaptic value or the weight of a corresponding branch (or synapse) and may transferred to the first hidden layer.

Values input to each of the first to fifth hidden nodes HN1 to HN5 are calculated with weights (or synaptic values) and transferred to the sixth to tenth hidden nodes HN6 to HN10 of the second hidden layer. Inputs of the sixth to tenth hidden nodes HN6 to HN10 are calculated with weights (or synaptic values) and transferred to the output node ON. The value of the output node ON may represent a result of learning or inference.

For example, although one output node ON is illustrated, the number of output nodes ON is not limited thereto. Illustratively, although the transfer of information is illustrated to proceed in one direction, at least one reverse path or circulating feedback path may be added to the neural network NN.

Figure 4:
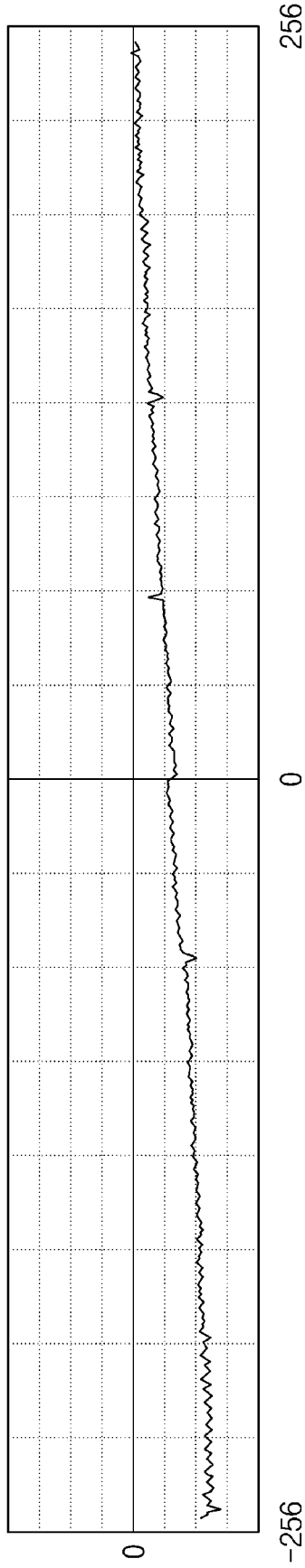
FIG. 4 is a diagram illustrating an example of input data and output data of an analog MAC when an error of a gain and a DC offset exists.

FIG. 4 illustrates an example of input data and output data of the analog MAC 111 when an error of a gain and a DC offset exists. In FIG. 4, a horizontal axis indicates input data and a vertical axis indicates output data. The input data may be one of values from '−256' to '256'.

Referring to FIGS. 1 and 4, when the input data are '0', the output data should be '0'. However, when the input data are '0' in FIG. 4, the output data are illustrated to be a value smaller than '0'.

Figure 5:
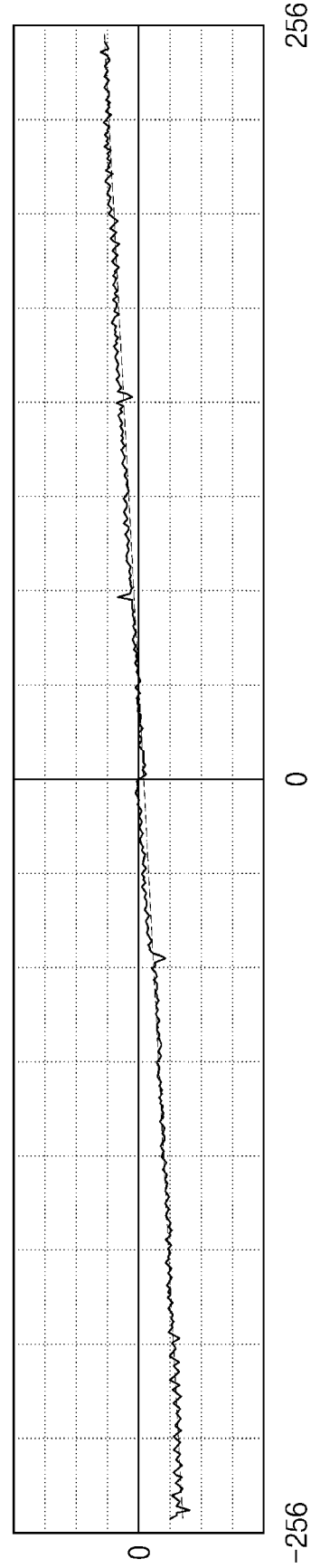
FIG. 5 is a diagram illustrating an example of input data and output data of an analog MAC when a calibration of a gain and a DC offset is performed.

FIG. 5 illustrates an example of input data and output data of the analog MAC 111 when a calibration of a gain and a DC offset is performed. In FIG. 5, a horizontal axis indicates input data, and a vertical axis indicates output data. The input data may be one of values from '−256' to '256'. Referring to FIGS. 1 and 5, when the input data are '0', it is illustrated that the output data are '0'. That is, errors in the gain and the DC offset are calibrated.

Figure 6:
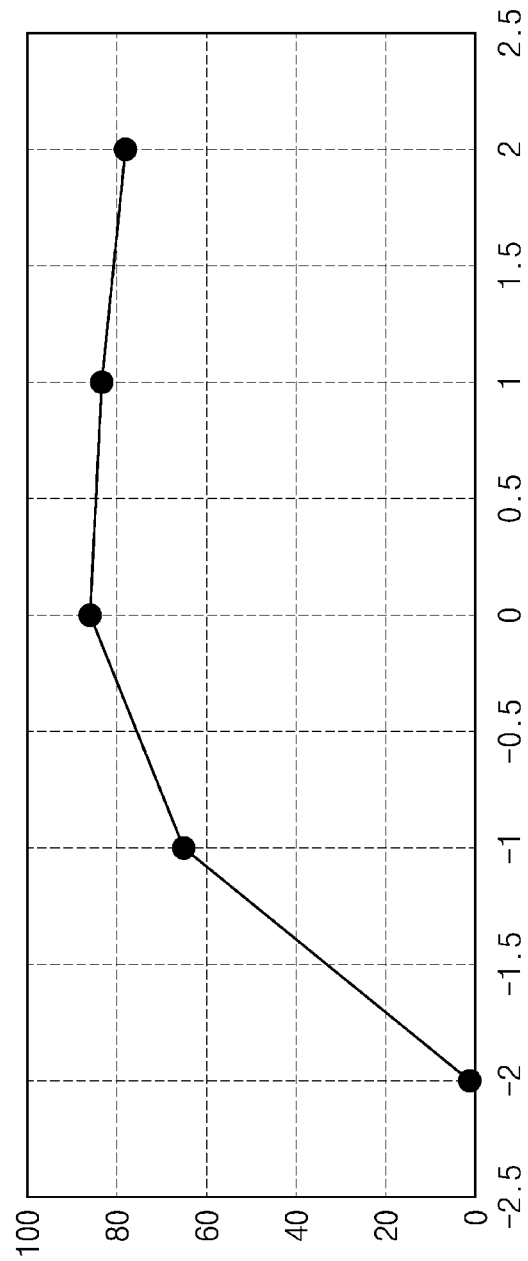
FIG. 6 is a diagram illustrating an example of a performance degradation of an analog MAC due to a DC offset.

FIG. 6 illustrates an example of a performance degradation of the analog MAC 111 due to a DC offset. In FIG. 6, a horizontal axis indicates the DC offset, and a vertical axis indicates performance. For example, when the gain is 0.95, an example of adjusting the DC offset is illustrated in FIG. 6. Referring to FIGS. 1 and 6, it is illustrated that as a magnitude (e.g., absolute value) of the DC offset increases, the performance decreases further.

The neural network computing device 100 according to an embodiment of the present disclosure may provide improved reliability by performing quantization by applying the gain and the DC offset of the analog MAC 111. In addition, since quantization is performed by the on-device quantizer 123 inside the neural network computing device 100, unique characteristics of the neural network computing device 100 and the analog MAC 111 are applied to the quantization process. Accordingly, the reliability of the neural network computing device 100 may be further improved.

In addition, since the neural network computing device 100 according to an embodiment of the present disclosure includes an on-device quantizer, re-quantization may be performed. Accordingly, when the performance of the neural network computing device 100 is lower than the required or deteriorated, the re-quantization may be performed after the hyper parameter is changed. That is, the reliability of the neural network computing device 100 may be further improved and the lifespan of the neural network computing device 100 may be increased.

Figure 7:
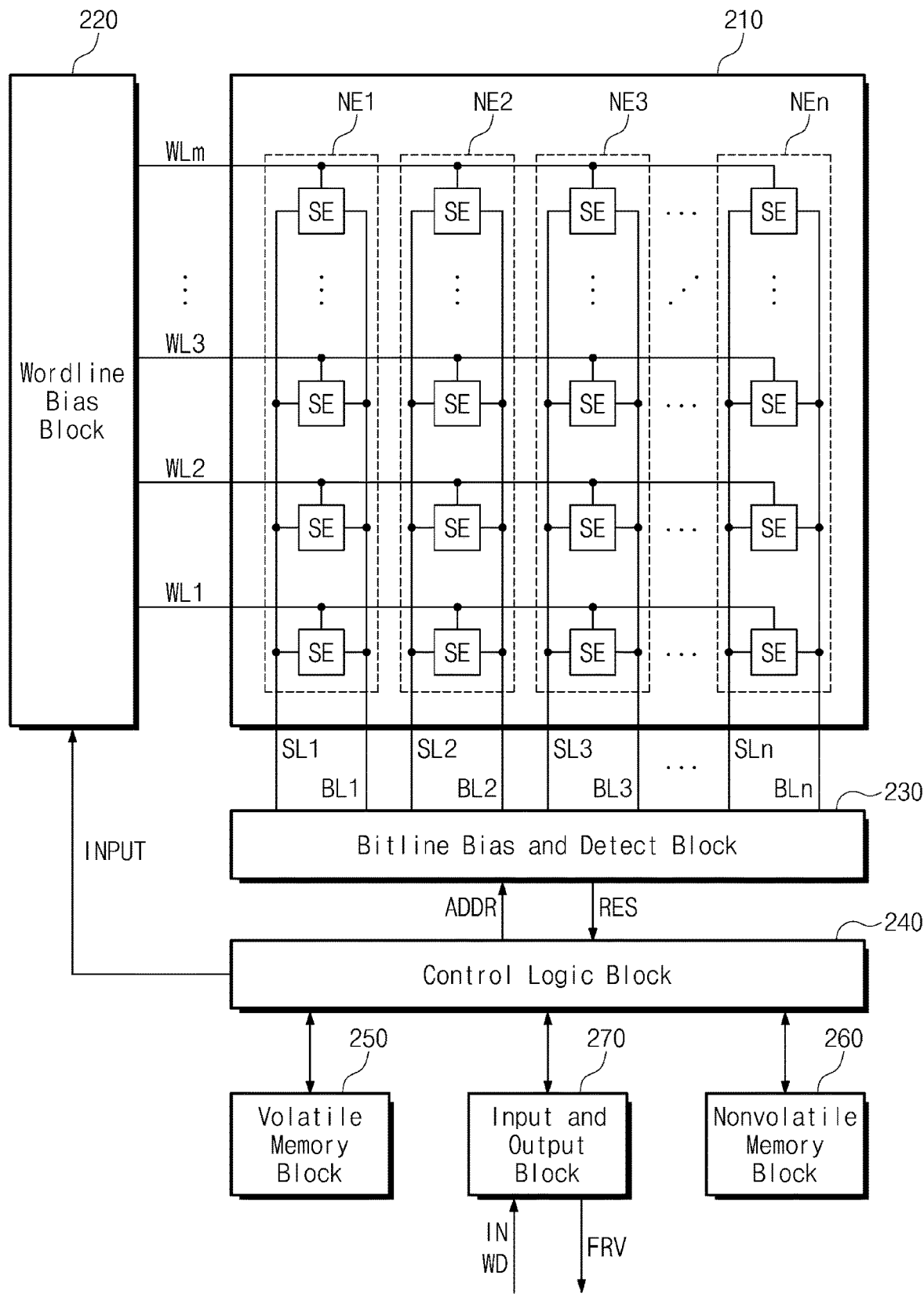
FIG. 7 is a block diagram illustrating an analog MAC according to an embodiment of the present disclosure.

FIG. 7 is a block diagram illustrating an analog MAC 200 according to an embodiment of the present disclosure. The analog MAC 200 may correspond to the analog MAC 111 of FIG. 1. Referring to FIG. 7, the analog MAC 200 may include a synaptic element array 210, a word line bias block 220, a bit line bias and detection block 230, a control logic block 240, a volatile memory block 250, a nonvolatile memory block 260, and an input and output block 270.

The synaptic element array 210 may include a plurality of synaptic elements SE. The synaptic elements SE may be arranged in rows and columns. Each of the rows of synaptic elements may be connected to a corresponding word line among first to 'm'-th word lines WL1 to WLm. Each of the columns of the synaptic elements SE may be connected to a corresponding one of first to 'n'-th bit lines BL1 to BLn, and may be connected to a corresponding one of first to 'n'-th source lines SL1 to SLn.

The word line bias block 220 is connected to the first to 'm'-th word lines WL1 to WLm. The word line bias block 220 may receive weight data WD as an input INPUT in the weight writing mode from the control logic block 240, and may receive the input data IN as the input INPUT in the neural network computation mode. In the weight writing mode and the neural network computation mode, the word line bias block 220 may provide a voltage or a current corresponding to the input INPUT to the first to 'm'-th word lines WL1 to WLm.

The bit line bias and detection block 230 is connected to the bit lines BL1 to BLn and the source lines SL1 to SLn. In the weight writing mode, the bit line bias and detection block 230 may bias the voltage or the current for writing the weight data WD to the bit lines BL1 to BLn and the source lines SL1 to SLn. In the neural network computation mode, the bit line bias and detection block 230 may sum the current that flows through at least one bit line selected from the bit lines BL1 to BLn or through at least one source line selected from the source lines SL1 to SLn.

For example, the bit line bias and detection block 230 may subtract a current amount of at least one selected source line from a current amount of at least one selected bit line. The bit line bias and detection block 230 may digitize the current amount for which the calculation is completed, and may output a computation result RES.

For example, computation operations of the synaptic elements SE may be performed in units of columns of the synaptic elements SE. The bit line bias and detection block 230 may receive an address ADDR from the control logic block 240 and may select at least one column of synaptic elements SE corresponding to the address ADDR.

A series of procedures in which the outputs of the synaptic elements SE of the selected column are collected from the corresponding bit line BL and source line SL are similar to a mechanism in which one neuron receives information through the synaptic elements and provides an output. Accordingly, each column of the synaptic elements SE may be referred to as a neuron. For example, the first to 'n'-th columns of the synaptic elements SE may be referred to as first to 'n'-th neuron elements NE1 to NEn, respectively.

The nonvolatile memory block 260 may store information on connection relationships between the neuron elements NE1 to NEn of the synaptic element array 210. For example, the nonvolatile memory block 260 may store information on which an initial input II should be provided to which neuron device(s) among the neuron elements NE1 to NEn of the synaptic element array 210.

The nonvolatile memory block 260 may include information on which neuron output value(s) of which neuron device(s) among the neuron elements NE1 to NEn of the synaptic element array 210 should be input to which neuron device(s). The nonvolatile memory block 260 may store information on which neuron output value(s) of which neuron device(s) among the neuron elements NE1 to NEn of the synaptic element array 210 should be selected as a final output value FRV.

That is, the nonvolatile memory block 260 may include information on an entire structure of the neural network implemented by the analog MAC 200. The control logic block 240 may read information stored in the nonvolatile memory block 260 and may control the word line bias block 220 and the bit line bias and detection block 230, based on the read information.

In the first mode, the control logic block 240 may receive the weight data WD and the input data IN. The control logic block 240 may temporarily store the weight data WD or the input data IN in the volatile memory block 250.

For example, the weight data WD may be calibration weight data. The control logic block 240 may transfer the weight data WD to the word line bias block 220, and may control the word line bias block 220 and the bit line bias and detection block 230 such that the weight data WD are written in the synaptic elements SE of at least one selected column.

For example, the input data IN may be calibration input data. The control logic block 240 may transfer the input data IN to the word line bias block 220, and may control the word line bias block 220 such that the input data IN are provided to the first to 'm'-th word lines WL1 to WLm. The control logic block 240 may control the bit line bias and detection block 230 such that currents of at least one selected column are summed (or summed and subtracted).

The control logic block 240 may receive the computation result RES from the bit line bias and detection block 230. The control logic block 240 may temporarily store the computation result RES in the volatile memory block 250 or may output the computation result RES as the final output value FRV.

In the second mode, the control logic block 240 may receive the weight data WD and the input data IN. The control logic block 240 may temporarily store the weight data WD or the input data IN in the volatile memory block 250.

The control logic block 240 may transfer the weight data WD to the word line bias block 220. The control logic block 240 may control the word line bias block 220 and the bit line bias and detection block 230 such that the weight data WD are written to the synaptic elements SE of at least one selected column.

The control logic block 240 may transfer the input data IN to the word line bias block 220, and may control the word line bias Block 220 such that the input data IN are provided to the first to 'm'-th word lines WL1 to WLm. The control logic block 240 may control the bit line bias and detection block 230 such that currents of at least one selected column are summed (or summed and subtracted).

The control logic block 240 may receive the computation result RES from the bit line bias and detection block 230. The control logic block 240 may temporarily store the computation result RES in the volatile memory block 250 or may output the computation result RES as the final output value FRV. The temporarily stored computation result RES may be reused as the input INPUT.

The volatile memory block 250 may include a static random access memory, a dynamic random access memory, a register, a latch, a flip-flop, etc. The nonvolatile memory block 260 may include an electrically erasable and programmable read-only memory (EEPROM), a flash memory, a magnetic memory, a resistive memory, a ferroelectric memory, a phase change memory, an electric fuse circuit, etc.

At least one of the volatile memory block 250 and the nonvolatile memory block 260 may be included as a sub-element of another component (e.g., the control logic block 240).

Figure 8:
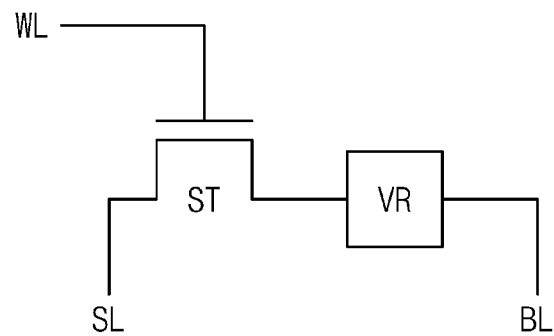
FIG. 8 is a diagram illustrating an example of a synaptic element of FIG. 7.

FIG. 8 illustrates an example of the synaptic element SE of FIG. 7. Referring to FIGS. 7 and 8, the synaptic element SE may include a selection element ST and a variable resistance element VR. The selection element ST may include a transistor connected between the source line SL and the variable resistance element VR. The gate of the selection element ST may be connected to the word line WL.

The variable resistance element VR may be connected between the selection element ST and the bit line BL. The variable resistance element VR may have a resistance value that is varied by a bias of voltages or currents. The variable resistance element VR may include a magnetic memory cell, a ferroelectric memory cell, a phase change memory cell, a resistive memory cell, etc.

For example, when one weight value is represented by two or more bits determined by the hyper parameter, one weight value may be implemented as a combination of two or more synaptic elements SE.

Figure 9:
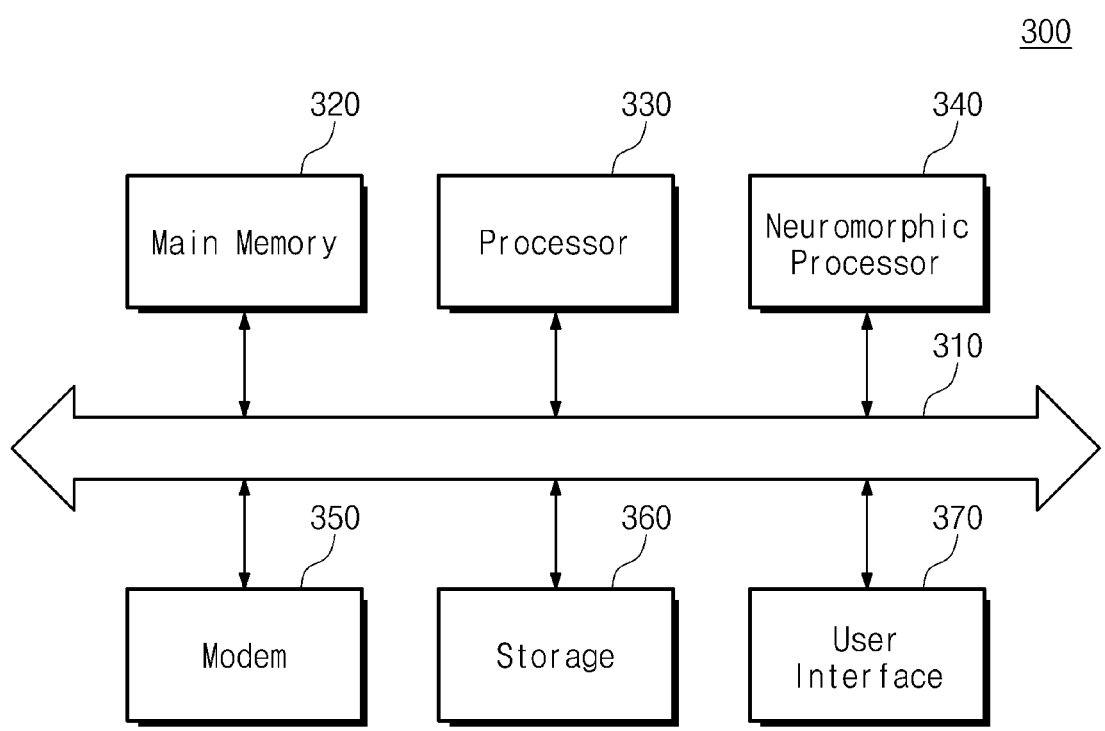
FIG. 9 is a diagram illustrating a computing device according to an embodiment of the present disclosure.

FIG. 9 illustrates a computing device 300 according to an embodiment of the present disclosure. Referring to FIG. 9, the computing device 300 may include a bus 310, a main memory 320, a processor 330, a neuromorphic processor 340, a modem 350, storage 360, and a user interface 370.

The bus 310 may provide a channel between components of the computing device 300. The main memory 320 may be used as an operating memory or a system memory of the computing device 300. The main memory 320 may include a random access memory such as a DRAM, a PRAM, an MRAM, a FRAM, an RRAM, etc.

The processor 330 may control operations of the computing device 300. The processor 330 may execute codes for controlling the computing device 300 such as an operating system, an application, and firmware using the main memory 320. The processor 330 may include a general purpose processor, an application processor, a special purpose processor, etc.

The neuromorphic processor 340 may be configured to perform the neural network computation. The neuromorphic processor 340 may include the neural network computing device 100 described with reference to FIG. 1.

The modem 350 may be configured to communicate with an external device. The modem 350 may store data received from the external device in the main memory 320, and may transfer the data stored in the main memory 320 to the external device.

The storage 360 may be an auxiliary memory of the computing device 300. The storage 360 may store data nonvolatilely. The storage 360 may include a hard disk drive, a solid state drive, etc.

The user interface 370 may include a user input interface configured to receive information from a user, such as a keyboard, a camera, a mouse, a microphone, a touch panel, a sensor, etc. The user interface 370 may include a user output interface configured to provide information to a user, such as a display, a speaker, a lamp, etc.

In response to a request of the processor 330, the neuromorphic processor 340 may enter the first mode. In the first mode, the neuromorphic processor 340 may perform the calibration described with reference to FIG. 2. For example, the calibration data may be provided from the processor 330 to the neuromorphic processor 340. Alternatively, raw data of the weight data may be provided from the processor 330 to the neuromorphic processor 340.

As the calibration is completed, the neuromorphic processor 340 may provide a message indicating that the calibration is completed to the processor 330. In response to the message, the processor 330 may control the neuromorphic processor 340 in the second mode. Alternatively, as the calibration is completed, the neuromorphic processor 340 may enter the second mode. Thereafter, the neuromorphic processor 340 may provide the message indicating that calibration is completed to the processor 330.

In the second mode, the processor 330 may request the neuromorphic processor 340 to classify the image data. For example, the processor 330 may request the neuromorphic processor 340 to classify image data stored in the main memory 320, image data stored in the storage 360, image data received through the modem 350, or image data obtained by the camera of the user interface 370.

In response to the request of the processor 330, the neuromorphic processor 340 may infer the image data. Upon completion of the inference, the neuromorphic processor 340 may provide the result of the classification to the processor 330 as the output data OUT.

According to a user's request or an internal schedule, the processor 330 may control the neuromorphic processor 340 back to the first mode. In this case, the processor 330 may request the neuromorphic processor 340 to change the hyper parameter. In response to the request of the processor 330, the neuromorphic processor 340 may change the hyper parameter and may again perform the calibration.

In the above-described embodiments, components according to the present disclosure are described using terms such as first, second, third, etc. However, terms such as first, second, and third are used to distinguish components from one another, and do not limit the present disclosure. For example, terms such as first, second, third, etc., do not imply numerical meaning in any order or in any form.

In the above-described embodiments, components according to embodiments of the present disclosure are illustrated using blocks. The blocks may be implemented as various hardware devices such as an Integrated Circuit (IC), an Application Specific IC (ASIC), a Field Programmable Gate Array (FPGA), and a Complex Programmable Logic Device (CPLD), a firmware running on hardware devices, software such as an application, or a combination of hardware devices and software. Further, the blocks may include circuits composed of semiconductor elements in the IC or circuits registered as an IP (Intellectual Property).

According to an embodiment of the present disclosure, an on-device quantizer may perform quantization, based on a gain and a DC offset of an analog multiplier and accumulator (MAC). Accordingly, a neural network computing device including an on-device quantizer having improved reliability, an operating method of the neural network computing device, and a computing device including the neural network computing device are provided.

The contents described above are specific embodiments for implementing the present disclosure. The present disclosure may include not only the embodiments described above but also embodiments in which a design is simply or easily capable of being changed. In addition, the present disclosure may also include technologies easily changed to be implemented using embodiments. Therefore, the scope of the present disclosure is not limited to the described embodiments but should be defined by the claims and their equivalents.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A neural network computing device comprising:
a neural network accelerator including an analog multiplier and accumulator (MAC);
a controller configured to control the neural network accelerator in one of a first mode and a second mode; and
a calibrator configured to calibrate a gain and a DC offset of the analog MAC, when the analog MAC is in the first mode, and
wherein the calibrator includes:
a memory configured to store weight data that are learned based on a machine learning, calibration weight data, and calibration input data;
a gain and offset calculator configured to read the calibration weight data and the calibration input data from the memory, to input the calibration weight data to the analog MAC, to input the calibration input data to the analog MAC, to receive calibration output data from the analog MAC, and to calculate the gain and the DC offset of the analog MAC from the calibration output data; and
an on-device quantizer configured to read the weight data from the memory, to receive the gain and the DC offset from the gain and offset calculator, to generate quantized weight data by quantizing the weight data, based on the gain and the DC offset, and to store the quantized weight data in the memory.

2. The neural network computing device of claim 1, wherein the quantized weight data stored in the memory are input to the analog MAC.

3. The neural network computing device of claim 2, wherein the analog MAC includes variable resistance synaptic elements, and
wherein the analog MAC is configured to adjust resistance values of the variable resistance synaptic elements, based on the quantized weight data.

4. The neural network computing device of claim 3, wherein, after the resistance values of the variable resistance synaptic elements are adjusted based on the quantized weight data, the controller controls the neural network accelerator in the second mode.

5. The neural network computing device of claim 4, wherein, in the second mode, in response to a request of an external device, the controller is further configured to adjust the number of bits of the quantized weight data, and to control the neural network accelerator in the first mode.

6. The neural network computing device of claim 1, wherein, in the second mode, the analog MAC generates output data by performing an inference on input data received from an external device.

7. The neural network computing device of claim 6, wherein the neural network accelerator further includes a classifier configured to classify a type of the input data, based on the output data, and to output the classified result to the external device.

8. The neural network computing device of claim 1, wherein the analog MAC, the calibrator, and the controller are integrated into one integrated circuit.

9. The neural network computing device of claim 1, wherein the calibration input data includes different values belonging to a range of values of input data of the analog MAC.

10. The neural network computing device of claim 1, wherein the calibration weight data includes different values belonging to a range of values of the weight data of the analog MAC.

11. The neural network computing device of claim 1, wherein the analog MAC includes:
synaptic elements arranged in rows and columns;
a word line bias block connected to rows of the synaptic elements through word lines, and configured to input the calibration input data or input data to the word lines; and
a bit line bias and detection block connected to the columns of the synaptic elements through bit lines, and configured to generate the calibration output data or output data by summing currents received through at least one selected bit line among the bit lines.

12. The neural network computing device of claim 11, wherein the word line bias block is further configured to input the calibration weight data to the word lines, and
wherein the bit line bias and detection block is further configured to adjust voltages of the bit lines such that the calibration weight data are written to selected synaptic elements among the synaptic elements.

13. A method of operating a neural network computing device including an analog multiplier and accumulator (MAC) and an on-device quantizer, the method comprising:
obtaining a gain and a DC offset of the analog MAC via a gain and offset calculator coupled to the analog MAC through a switch that routes calibration output data;
quantizing weight data via an on-device quantizer that is coupled to the gain and offset calculator and that uses the gain and the DC offset to transform the weight data into quantized weight data representing quantized values; and
writing the quantized weight data to memory elements of the analog MAC.

14. The method of claim 13, wherein the obtaining of the gain and the DC offset includes:
writing calibration weight data in the analog MAC;
inputting calibration input data to the analog MAC;
obtaining calibration output data corresponding to the calibration weight data and the calibration input data from the analog MAC; and
calculating the gain and the DC offset of the analog MAC from the calibration output data.

15. The method of claim 13, further comprising:
inputting input data to the analog MAC;
obtaining output data corresponding to the input data and the quantized weight data from the analog MAC; and
classifying a type of the input data, based on the output data.

16. The method of claim 13, further comprising:
in response to a request from an external device, again performing the obtaining of the gain and the DC offset, the quantizing of the weight data, and the writing of the quantized weight data.

17. The method of claim 16, wherein the again performing of the obtaining, the quantizing, and the writing includes adjusting the number of bits of the quantized weight data.

18. A computing device comprising:
a main memory;
a processor configured to execute commands and to process data, using the main memory; and
a neuromorphic processor configured to perform a calibration in a first mode in response to a request of the processor and to perform an inference on image data in a second mode, and
wherein the neuromorphic processor includes:
a neural network accelerator including an analog multiplier and accumulator (MAC);

a controller configured to control the neural network accelerator in one of the first mode and the second mode; and a calibrator configured to calibrate a gain and a DC offset of the analog MAC, when the analog MAC is in the first mode, and wherein the neuromorphic processor quantizes weight data, based on the gain and the DC offset of the analog MAC, writes the quantized weight data in the analog MAC, enters the second mode, and notifies the processor of entering the second mode.

19. The computing device of claim 18, wherein the calibrator includes:

a memory configured to store the weight data that are learned based on a machine learning, calibration weight data, and calibration input data;

a gain and offset calculator configured to read the calibration weight data and the calibration input data from the memory, to input the calibration weight data to the analog MAC, to input the calibration input data to the analog MAC, to receive calibration output data from the analog MAC, and to calculate the gain and the DC offset of the analog MAC from the calibration output data; and an on-device quantizer configured to read the weight data from the memory, to receive the gain and the DC offset from the gain and offset calculator, to generate quantized weight data by quantizing the weight data, based on the gain and the DC offset, and to store the quantized weight data in the memory.

20. The computing device of claim 18, further comprising:

storage configured to store data nonvolatilely;

a modem configured to communicate with an external device; and a user interface configured to exchange information with a user, and to include a camera, and wherein the image data are received from at least one of the main memory, the storage, the modem, and the camera.

* * * * *